UNITED STATES PATENT OFFICE.

GEORGE WEBB, JR., AND GEORGE HENRY RAYNER, OF LONDON, ENGLAND.

PROCESS OF MAKING OXYGEN.

SPECIFICATION forming part of Letters Patent No. 500,697, dated July 4, 1893.

Application filed May 18, 1892. Serial No. 433,471. (No specimens.)

*To all whom it may concern:*

Be it known that we, GEORGE WEBB, Jr., engineer, of 13 Mill Street, Lambeth Walk, and GEORGE HENRY RAYNER, architect, of 37 Chancery Lane, London, England, subjects of the Queen of Great Britain and Ireland, have invented a certain new and useful Composition of Matter to be Used in the Manufacture of Oxygen Gas, of which the following is a specification.

Our invention relates to improvements in the manufacture of oxygen gas from atmospheric air according to the well known process carried on originally at Pantin, near Paris, France, by Messrs. Tessié du Motay and Maréchal, and has for its object to provide a compound for absorbing the oxygen from the air and subsequently surrendering the same, which, although being of a similar nature to that used by the above mentioned chemists as well as by many others, is subjected to such a treatment as to render it suitable for carrying out successfully the process aforesaid, that is to say, so as to prevent it from caking or fusing whenever in the course of constant usage it is accidentally raised to a higher temperature than is ordinarily required for the operation.

To carry our invention into practice we use a furnace and numerous suitable retorts, arranged in such a manner that air and steam may be alternately supplied at one end of the said retorts while the nitrogen freed and the oxygen produced may be allowed to alternately escape at the other end, but as any similar apparatus would answer the purpose we make no claim thereto, such apparatus being merely composed of contrivances constantly used by chemists for general experimental purposes and being well known under the before mentioned process.

The improved compound above referred to is prepared in the following manner:—Sixteen ounces or thereabout of caustic soda are dissolved in about forty fluid ounces of hot water and the mixture is heated to a temperature of about 100° centigrade in a suitable vessel until the caustic soda has entirely dissolved. Sixteen ounces or thereabout of oxide of manganese and sixteen ounces of manganate of soda are now added to the mixture which is diligently stirred under the action of heat until the moisture is evaporated and the resulting mass is dry. This mass is subsequently heated to a bright red or even white temperature greatly in excess of that to which the compound will have to be subjected during the manufacture of the oxygen. The mass is then removed from the vessel and broken up into small pieces about the size of a walnut. These pieces which are slightly adhesive are afterward rolled in powdered oxide of manganese in order that they may retain as much of the latter as will adhere thereto. This operation is of great importance and its non-performance may mar the success of the operation, as the pieces are thereby prevented from coalescing and caking when subjected to an excessive heat (such as white heat) in the retorts, which has hitherto rendered useless the chemical compositions used for this purpose.

The compound produced in the manner just described is placed in a number of retorts having each two inlets and two outlets. Air is blown into a wash bottle containing a strong solution of soda whereby it is freed from the carbonic acid which it contains and passes subsequently through another bottle containing sulphuric acid and having for its object to free the air from any moisture which may be present. The retorts are heated to a dull or crimson heat by a furnace of any suitable construction, the air entering therein through one of its inlets, while the corresponding outlet is left open. The compound will now absorb the oxygen from the air, the nitrogen of which will be free to escape through the open outlet. When the compound is saturated with oxygen, the nitrogen outlet and the air inlet are closed, and steam is admitted through the other inlet when the oxygen surrendered by the compound in the retort is allowed to pass through the other outlet. When the whole of the oxygen yielded has passed off, the inlets and outlets are reversely opened and closed and the first stage of the process repeated.

What we claim as our invention, and desire to secure by Letters Patent, is—

1. In a process of obtaining oxygen gas from atmospheric air, the herein described step which consists in rolling in powdered oxide of manganese, a compound formed from caustic soda, oxide of manganese, and manganate of soda in the manner described.

2. The herein described method of preparing a composition for use in the production of oxygen gas which consists in dissolving caustic soda in hot water, heating the mixture to about 100° centigrade then adding to the mixture oxide of manganese and manganate of soda, heating and stirring the mass until the moisture has evaporated, then heating the resultant dry mass to a temperature as described, then allowing the composition to cool, and finally breaking it into pieces.

In witness whereof we have hereunto set our hands, at London, this 5th day of April, 1892, in the presence of two witnesses.

GEORGE WEBB, JUNR.
   GEORGE HENRY RAYNER.

In presence of—
 JAMES MILLER,
 ALBERT EDWARD ELLEN.